(12) United States Patent
Mahdi et al.

(10) Patent No.: US 8,358,647 B2
(45) Date of Patent: Jan. 22, 2013

(54) SYSTEM AND METHOD FOR PROVISION OF IMS BASED SERVICES FOR LEGACY CS UE WITH HOME NODE B ACCESS

(75) Inventors: Kaniz Mahdi, Carrollton, TX (US); Hugh Shieh, Sammamish, WA (US)

(73) Assignees: FutureWei Technologies, Inc., Plano, TX (US); AT&T Mobility II LLC, Atlanta, GA (US)

( * ) Notice: Subject to any disclaimer, the term of this patent is extended or adjusted under 35 U.S.C. 154(b) by 805 days.

(21) Appl. No.: 12/486,645

(22) Filed: Jun. 17, 2009

(65) Prior Publication Data

US 2010/0069101 A1 Mar. 18, 2010

Related U.S. Application Data

(60) Provisional application No. 61/098,095, filed on Sep. 18, 2008.

(51) Int. Cl.
*H04L 12/66* (2006.01)

(52) U.S. Cl. ........ 370/352; 370/331; 455/436; 455/437; 455/439

(58) Field of Classification Search .......... 370/331, 370/338, 352, 353, 354, 355, 356, 342, 522; 455/436, 437, 439, 444, 466
See application file for complete search history.

(56) References Cited

U.S. PATENT DOCUMENTS

| 7,522,585 B2* | 4/2009 | Liu et al. ................. 370/354 |
| 7,975,037 B2* | 7/2011 | Tai et al. ................. 709/223 |
| 2004/0162077 A1 | 8/2004 | Kauranen et al. |
| 2006/0268849 A1* | 11/2006 | Larsson et al. ............ 370/356 |
| 2007/0058788 A1* | 3/2007 | Mahdi et al. ............... 379/88.17 |
| 2007/0061397 A1 | 3/2007 | Gregorat et al. |
| 2007/0121608 A1* | 5/2007 | Gu et al. ................. 370/356 |
| 2007/0213078 A1 | 9/2007 | Shaheen |
| 2007/0281717 A1* | 12/2007 | Bharadwaj .................. 455/466 |
| 2008/0009287 A1 | 1/2008 | Donovan et al. |
| 2008/0032695 A1 | 2/2008 | Zhu et al. |

(Continued)

FOREIGN PATENT DOCUMENTS

CN 1756242 A 4/2006

(Continued)

OTHER PUBLICATIONS

3rd Generation Partnership Project, Technical Specification Group Core Network and Terminals, "Handover Procedures," Release 7, 3GPP TS 23.009 V7.0.0, Mar. 2007, pp. 1-287.
3rd Generation Partnership Project, Technical Specification Group Core Network and Terminals, "Handover Procedures," Release 8, 3GPP TS 23.009 V8.1.0, Mar. 2009, pp. 1-289.
3rd Generation Partnership Project, Technical Specification Group Services and System Aspects, "Support of Short Message Service (SMS) over generic 3GPP Internet Protocol (IP) access," Stage 2, Release 8, 3GPP TS 23.204 V8.2.0, Jun. 2008, pp. 1-37.

(Continued)

*Primary Examiner* — Hassan Phillips
*Assistant Examiner* — Ajay Cattungal
(74) *Attorney, Agent, or Firm* — Slater & Matsil, L.L.P.

(57) ABSTRACT

A system and method for allowing legacy circuit switched user equipment (CS UE) to operate via a packet-switch system, such as an IP Multimedia Subsystem (IMS) system, is provided. The mobility and session control aspects of communications with a legacy CS UE is separated. A user agent is placed in the receiving node (e.g., a home node B) that acts as the SIP agent for the CS UE for session control. An interworking function is provided to allow mobility between the macro CS network and the PS (e.g., IMS) network.

20 Claims, 7 Drawing Sheets

U.S. PATENT DOCUMENTS

| | | | |
|---|---|---|---|
| 2008/0090570 A1 | 4/2008 | Deshpande et al. | |
| 2008/0117878 A1 | 5/2008 | Kim et al. | |
| 2008/0181205 A1* | 7/2008 | Azada et al. | 370/355 |
| 2008/0291874 A1* | 11/2008 | Bae et al. | 370/331 |
| 2008/0316998 A1 | 12/2008 | Procopio et al. | |
| 2009/0086719 A1* | 4/2009 | Mutikainen et al. | 370/352 |
| 2009/0104905 A1 | 4/2009 | DiGirolamo et al. | |
| 2009/0147754 A1 | 6/2009 | Long et al. | |
| 2009/0156213 A1* | 6/2009 | Spinelli et al. | 455/436 |
| 2009/0257418 A1* | 10/2009 | Allen et al. | 370/338 |
| 2009/0265543 A1 | 10/2009 | Khetawat et al. | |
| 2010/0041405 A1 | 2/2010 | Gallagher et al. | |
| 2010/0048216 A1* | 2/2010 | Sundarraman et al. | 455/444 |
| 2010/0067493 A1 | 3/2010 | Mahdi | |
| 2010/0074223 A1 | 3/2010 | Mahdi | |
| 2010/0074224 A1 | 3/2010 | Mahdi et al. | |
| 2010/0077459 A1 | 3/2010 | Mahdi et al. | |
| 2010/0238920 A1 | 9/2010 | Salkintzis et al. | |
| 2010/0293265 A1 | 11/2010 | Lindholm et al. | |
| 2010/0309822 A1 | 12/2010 | Witzel et al. | |

FOREIGN PATENT DOCUMENTS

| | | |
|---|---|---|
| CN | 101061729 A | 10/2007 |
| CN | 101212386 A | 7/2008 |
| EP | 1 909 438 A1 | 4/2008 |
| WO | WO 2007/009298 A1 | 1/2007 |
| WO | WO 2010/031349 A1 | 3/2010 |

OTHER PUBLICATIONS

3$^{rd}$ Generation Partnership Project, Technical Specification Group Services and System Aspects, "Support of Short Message Service (SMS) over generic 3GPP Internet Protocol (IP) access," Stage 2, Release 8, 3GPP TS 23.204 V8.4.0, Mar. 2009, pp. 1-37.

3$^{rd}$ Generation Partnership Project, Technical Specification Group Services and System Aspects, "Single Radio Voice Call Continuity (SRVCC)," Stage 2, Release 8, 3GPP TS 23.216 V8.0.0, Jun. 2008, pp. 1-20.

3$^{rd}$ Generation Partnership Project, Technical Specification Group Services and System Aspects, "Single Radio Voice Call Continuity (SRVCC)," Stage 2, Release 9, 3GPP TS 23.216 V9.0.0, Jun. 2009, pp. 1-39.

3$^{rd}$ Generation Partnership Project, Technical Specification Group Services and System Aspects, "IP Multimedia Subsystem (IMS)," Stage 2, Release 8, 3GPP TS 23.228 V8.5.0, Jun. 2008, pp. 1-240.

3$^{rd}$ Generation Partnership Project, Technical Specification Group Services and System Aspects, "IP Multimedia Subsystem (IMS)," Stage 2, Release 9, 3GPP TS 23.228 V9.0.0, Jun. 2009, pp. 1-250.

3$^{rd}$ Generation Partnership Project, Technical Specification Group Services and Architecture, "IP Multimedia Subsystem (IMS) Service Continuity," Stage 2, Release 8, 3GPP TS 23.237 V8.0.0, Jun. 2008, pp. 1-40.

3$^{rd}$ Generation Partnership Project, Technical Specification Group Services and Architecture, "IP Multimedia Subsystem (IMS) Service Continuity," Stage 2, Release 9, 3GPP TS 23.237 V9.1.0, Jun. 2009, pp. 1-88.

3$^{rd}$ Generation Partnership Project, Technical Specification Group Services and System Aspects, "IP Multimedia Subsystem (IMS) Centralized Services," Stage 2, Release 8, 3GPP TS 23.292 V8.0.0, Jun. 2008, pp. 1-89.

3$^{rd}$ Generation Partnership Project, Technical Specification Group Services and System Aspects, "IP Multimedia Subsystem (IMS) centralized services," Stage 2, Release 9, 3GPP TS 23.292 V9.2.0, Jun. 2009, pp. 1-105.

3$^{rd}$ Generation Partnership Project, Technical Specification Group Services and System Aspects, "IMS Aspects of Architecture for Home NodeB," Stage 2, Release 9, 3GPP TR 23.832 V0.4.0, May 2009, pp. 1-61.

3$^{rd}$ Generation Partnership Project, Technical Specification Group Services and System Aspects, "IP Multimedia Subsystem (IMS) service continuity enhancements; Service, policy and interaction," Stage 2, Release 9, 3GPP TR 23.838 V9.0.0, Jun. 2009, pp. 1-51.

3$^{rd}$ Generation Partnership Project, Technical Specification Group Core Network and Terminals, "Mobile radio interface Layer 3 specification; Core network protocols," Stage 3, Release 8, 3GPP TS 24.008 V8.2.0, Jun. 2008, pp. 1-553.

3$^{rd}$ Generation Partnership Project, Technical Specification Group Core Network and Terminals, "Mobile radio interface Layer 3 specification; Core network protocols," Stage 3, Release 8, 3GPP TS 24.008 V8.6.0, Jun. 2009, pp. 1-582.

3$^{rd}$ Generation Partnership Project, Technical Specification Group Core Network and Terminals, "IP multimedia call control protocol based on Session Initiation Protocol (SIP) and Session Description Protocol (SDP)," Stage 3, Release 9, 3GPP TS 24.229 V9.0.0, Jun. 2009, pp. 1-623.

3$^{rd}$ Generation Partnership Project, Technical Specification Group Radio Access Network, "UTRAN Iu interface RANAP signalling," Release 7, 3GPP TS 25.413 V7.9.0, Jun. 2008, pp. 1-359.

3$^{rd}$ Generation Partnership Project, Technical Specification Group Radio Access Network, "UTRAN Iu interface Radio Access Network Application Part (RANAP) signalling," Release 8, 3GPP TS 25.413 V8.3.0, Jun. 2009, pp. 1-398.

3$^{rd}$ Generation Partnership Project, Technical Specification Group Radio Access Network, "UTRAN architecture for 3G Home Node B (HNB)," Stage 2, Release 8, 3GPP TS 25.467 V8.2.0, Jun. 2009, pp. 1-26.

3$^{rd}$ Generation Partnership Project, Technical Specification Group Core Network and Terminals, "Evolved Packet System; 3GPP EPS SV interface (MME to MSC) for SRVCC," Release 8, 3GPP TS 29.280 V1.0.1, Sep. 2008, pp. 1-10.

3$^{rd}$ Generation Partnership Project, Technical Specification Group Core Network and Terminals, "Evolved Packet System; 3GPP Sv interface (MME to MSC, and SGSN to MSC) for SRVCC," Release 8, 3GPP TS 29.280 V8.1.0, Mar. 2009, pp. 1-13.

3$^{rd}$ Generation Partnership Project, Technical Specification Group Services and System Aspects, "Security aspects of early IP Multimedia Subsystem (IMS)," Release 8, 3GPP TS 33.178 V1.0.0, Mar. 2008, pp. 1-26.

3$^{rd}$ Generation Partnership Project, Technical Specification Group Services and System Aspects, "3GPP System Architecture Evolution (SAE); Security architecture," Release 8, 3GPP TS 33.401 V8.0.0, Jun. 2008, pp. 1-45.

3$^{rd}$ Generation Partnership Project, Technical Specification Group Services and System Aspects, "3GPP System Architecture Evolution (SAE); Security architecture," Release 9, 3GPP TS 33.401 V9.0.0, Jun. 2009, pp. 1-99.

Written Opinion of the International Searching Authority, Applicant: Huawei Technologies Co., Ltd., International Application No. PCT/CN2009/074020, Date of mailing Dec. 31, 2009, 5 pages.

International Search Report, Applicant: Huawei Technologies Co., Ltd., International Application No. PCT/CN2009/074020, Date of mailing Dec. 31, 2009, 12 pages.

3$^{rd}$ Generation Partnership Project, Technical Specification Group Services and System Aspects, "Single Radio Voice Call Continuity (SRVCC)," Stage 2, Release 8, 3GPP TS 23.216 V8.1.0, Sep. 2008, pp. 1-29.

3$^{rd}$ Generation Partnership Project, Technical Specification Group Services and System Aspects, "IP Multimedia Subsystem (IMS)," Stage 2, Release 8, 3GPP TS 23.228 V8.6.0, Sep. 2008, pp. 1-241.

3$^{rd}$ Generation Partnership Project, Technical Specification Group Services and Architecture, "IP Multimedia Subsystem (IMS) Service Continuity," Stage 2, Release 8, 3GPP TS 23.237 V8.1.0, Sep. 2008, pp. 1-41.

3$^{rd}$ Generation Partnership Project, Technical Specification Group Services and System Aspects, "IP Multimedia Subsystem (IMS) Centralized Services," Stage 2, Release 8, 3GPP TS 23.292 V8.1.0, Sep. 2008, pp. 1-90.

3$^{rd}$ Generation Partnership Project, Technical Specification Group Core Network and Terminals, "Mobile radio interface Layer 3 specification; Core network protocols," Stage 3, Release 8, 3GPP TS 24.008 V8.3.0, Sep. 2008, pp. 1-556.

3$^{rd}$ Generation Partnership Project, Technical Specification Group Radio Access Network, "UTRAN Iu interface RANAP signalling," Release 8, 3GPP TS 25.413 V8.0.0, Sep. 2008, pp. 1-374.

* cited by examiner

SYSTEM AND METHOD FOR PROVISION OF IMS BASED SERVICES FOR LEGACY CS UE WITH HOME NODE B ACCESS

This application claims the benefit of U.S. Provisional Application No. 61/098,095, filed on Sep. 18, 2008, entitled "System and Method for Provision of IMS Based Services for Legacy CS UE with Home Node B Access," which application is hereby incorporated herein by reference.

TECHNICAL FIELD

The present invention relates generally to telecommunications and, more particularly, to a system and method for providing IP Multimedia Subsystem (IMS)-based services using circuit-switched (CS) user equipment (UE) with access over a femtocell system.

BACKGROUND

In telecommunications, a femtocell—originally known as an Access Point Base Station—is a small cellular base station, typically designed for use in residential or small business environments. It connects to the service provider's network via broadband (such as DSL or cable). A femtocell allows service providers to extend service coverage indoors, especially where access would otherwise be limited or unavailable. The femtocell incorporates the functionality of a typical base station, but extends it to allow a simpler, self-contained deployment.

A Node B is an element of a 3G macro Radio Access Network (RAN), and a Home Node B (HNB) is the 3GPP's term for a 3G femtocell. Within an HNB Access Network there are two network elements: a HNB (or femtocell) and a Home Node B Gateway (HNB-GW). The HNB is connected to an existing residential broadband service and provides 3G radio coverage for 3G handsets within a home. The HNB Gateway is installed within an operator's network and aggregates traffic from a large number of HNBs back into an existing core service network.

Generally, a legacy wireless device communicates via a circuit-switched (CS) network. In the case of a HNB, a legacy CS wireless device communicates via CS techniques with the HNB access point. The HNB then communicates via the HNB-GW to provide access to the CS core, also referred to as the macro CS.

As mobile devices improve and include more enhanced capabilities, mobile devices have evolved to act as Internet Protocol (IP) devices. IP devices typically implement IP Multimedia services (IMS) sessions that utilize packet-switch (PS) communications instead of CS communications. Legacy CS devices, however, are unable to communicate with the PS network, and hence, the legacy CS devices are unable to utilize services or take advantage of the capabilities offered by IMS systems or other PS networks.

Thus, there is a need for a method and system that allows the legacy CS devices to utilize IMS services when communicating via a femtocell.

SUMMARY OF THE INVENTION

These and other problems are generally solved or circumvented, and technical advantages are generally achieved, by preferred embodiments of the present invention which provides for access to an IP multimedia (IMS) sessions using a circuit switch (CS) device.

Embodiments of the present invention provide a system and a method for allowing legacy circuit switched user equipment (CS UE) to operate via a packet-switch system, such as an IP Multimedia Subsystem (IMS) system. An embodiment utilizes a femtocell, such as a home node B, or other cell with an agent that interfaces between the CS system utilized by the legacy CS UE and the packet-switch system.

In an embodiment, the mobility and session control aspects of communications with a legacy CS UE are separated. A home user agent (HUA) is located in the home node B (HNB) and acts as the SIP agent for the CS UE for session control. An interworking function is provided to allow mobility between the macro CS network and the PS (e.g., IMS) network.

In other embodiments, a short message service (SMS) may be implemented such that the HNB/HUA encapsulates SMS messages in using SIP for delivery via the IMS system. Unstructured supplementary services data (USSD) applications may also be implemented, wherein the HUA processes the USSD and invokes the respective Multimedia Telephony (MMTEL) service for the related voice session. In yet another example, HUA interfaces USSD with SIP for delivery via a packet-switch network, e.g., IMS.

Various embodiments of the invention provide advantages. For example, an embodiment can be fully scalable since it places the SIP in customer premise equipment. In addition, embodiments may partially or completely offload the CS Core network of the session control signaling. It also provides service continuity with CS as well as PS macro cellular. The placement of the SIP UA in the home premise equipment enables enrichment of subscriber experience with subscriber based SIP features such as picture caller ID. Further, embodiments place mobility functions in the transport layer, as opposed to some other approaches that place these functions in the application layer thereby requiring tunneling of transport layer information in application layer signaling.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the present invention allow user equipment (UE) configured to only provide circuit-switched (CS) communications to access the packet-switched (PS) network, and hence, IP Multimedia Subsystem (IMS) services. Embodiments of the present invention will be described with respect to embodiments in a specific context, namely a system and method for the provision of IMS-based services for legacy CS UE with Home Node B Access. Other embodiments of the present invention, however, may be applied to ad hoc networks, cellular networks, wireline networks, and the like, as well as other architectural configurations.

As discussed in greater detail below, an embodiment of the present invention provides a Session Initiation Protocol (SIP) user agent (UA) collocated with the Home Node B (HNB) for interworking CS session control procedures with SIP session control procedures. A transport layer interworking function (IWF) is provided for idle mode mobility with a collaboration of the SIP UA in the HNB. The IWF in collaboration with the SIP UA in the HNB and a SIP Application Server enables active mode mobility between HNB and macro CS or macro PS networks.

Figure 1:
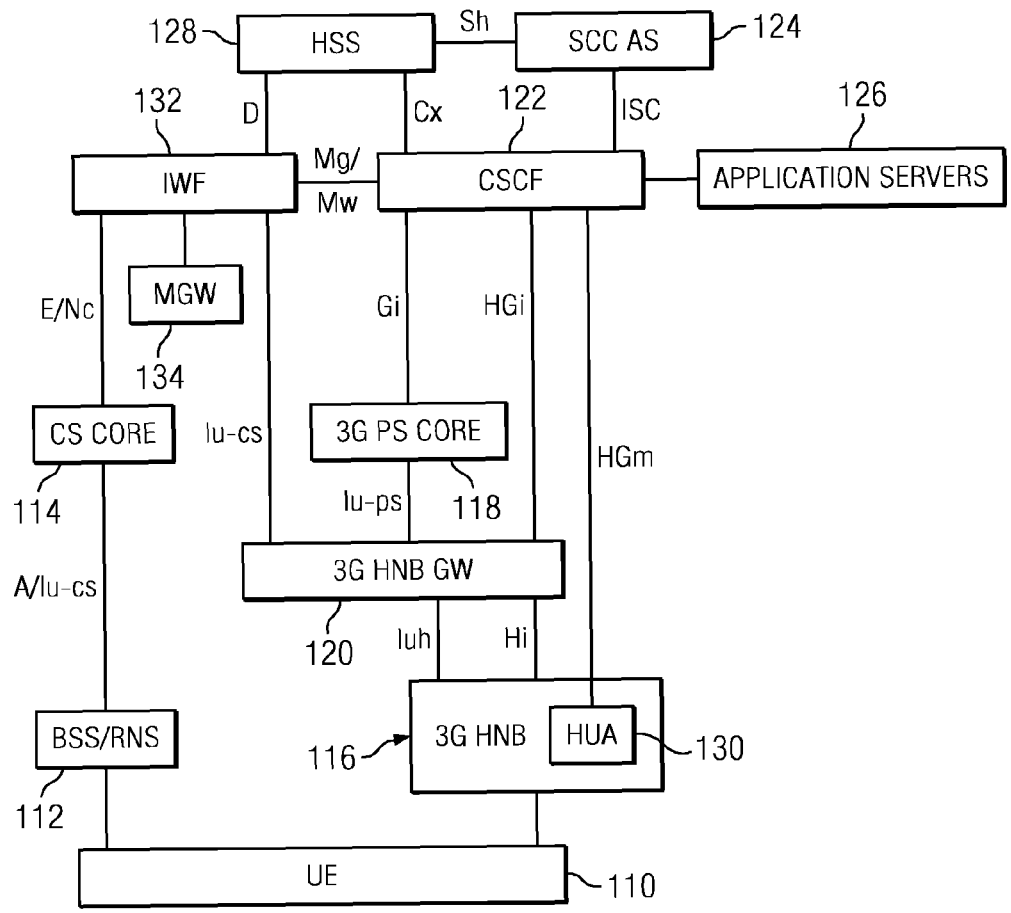
FIG. 1 illustrates a functional architecture diagram in accordance with an embodiment of the present invention.

Referring now to FIG. 1, there is shown a functional architecture diagram in accordance with an embodiment of the present invention. A CS UE 110 comprises a user device and may include any type of device providing voice and/or data access, such as a wireless phone, computer, personal data assistant (PDA), or the like via a CS communications path. Generally, in legacy systems a CS UE connects via a Base Station Subsystem (BSS)/Radio Network Subsystem (RNS) 112, which provides the connectivity and wireless transmission interface between the CS core 114 and the CS UE 110.

In an IMS system, a HNB 116 acts as an access point, typically within a user's home, to provide a PS connection to the 3G PS core 118 via a 3G HNB Gateway (GW) 120. A traditional IMS session is created between a UE and a remote end (not shown), thereby enabling the UE to access media flows. The session control signaling flow extends between a Call Session Control Function (CSCF) 122 and possibly a Service Centralization Continuity Application Server (SCC AS) 124 or other application servers (126).

Generally, the CSCF 122 processes SIP signaling packets in the IMS system, and the application servers 126 host and execute a variety of services. In one embodiment, the SCC AS 124 operates in a Back-to-Back User Agent (B2BUA) mode wherein it acts as an SIP element to mediate SIP signaling between the UE and the remote end. Application servers may be executed on the remote leg as part of standard service execution logic at the CSCF 122.

A home subscriber server (HSS) 128 provides a subscriber database and contains user-related subscription data, such as location information, security information, user profile information, and the like, required to handle IMS sessions.

One of ordinary skill in the art, however, will realize that the architecture discussed above fails to provide IMS access to legacy CS UE, such as CS UE 10. In accordance with an embodiment of the present invention, a home user agent (HUA) 130 is added to the 3G HNBB 116 as illustrated in FIG. 1. The HUA 130 is a logical function that acts as a SIP UA providing SIP session control on behalf of the UE using CS procedures for voice, preferably located with the 3G HNB 116. The HUA 130 provides IMS registration upon a CS attach procedure and interworks CS session/service control with IMS session/service control over an HGm interface point with the CSCF 122, e.g., the IMS system. In a typical femtocell access, a PS UE includes an SIP client for access to the PS core. In this case, however, the HUA 130 acts as the SIP client on behalf of the CS UE 110 (which is not SIP capable), providing translation services between the CS UE 110 and the PS network.

The HUA 130 also initiates a PS-to-CS and PS-to-PS service continuity procedures on behalf of the CS UE 110 to provide mobility to the CS UE 10. An inter-working function (IWF) 132, which provides functionality similar to a mobile switching center (MSC) in the macro CS network, is responsible for interfacing with the femtocell system to provide handover capability between the CS network of the macro CS core 114 and the 3G HNB 116. The IWF 132 also provides visitor location register (VLR) emulation for CS location updates and interfaces with a media gateway 134, which provides translation services between the IMS network and the macro CS network for media flows over the CS network.

It should be noted that other network elements, such as routers, gateways, switches, and/or the like, may be present within the networks. The configurations and the communications between network elements is provided for illustrative purposes only, and as such, the communications between the specified elements may be between different elements and/or through additional elements as well as different signaling/commands may be used.

As discussed in greater detail in the following paragraphs, the general principles of the present invention may be applied to various scenarios. It should be noted that the following embodiments are provided for illustrative purposes only and are not intended to limit the scope of the present invention to only those embodiments described herein. Furthermore, it should be noted that the messages and the message parameters are provided for illustrative purposes only and that other messages and parameters may be used, as well as any suitable protocol, such as session description protocol (SDP), session initiation protocol (SIP), or the like. Additional information regarding the various network elements, interfaces, and message flows may be found in 3GPP TS 23.228, v9.0.0 and 3GPP TS 23.237, v9.1.0, which are incorporated herein by reference.

As one of ordinary skill in the art will appreciate, the architecture discussed above allows a legacy CS UE to use a femtocell system without requiring specialized equipment on the CS UE such that the use of the femtocell system and the IMS system is transparent to the CS UE and the user has full mobility between the IMS femtocell system and the macro CS system. This is provided by the above architecture due to the separation of the session control and mobility components, such that the session control is handled by the HUA 130 in the HNB while the mobility (including location updates and handovers) is handled by the IWF 132 in the CS domain.

Figure 2:
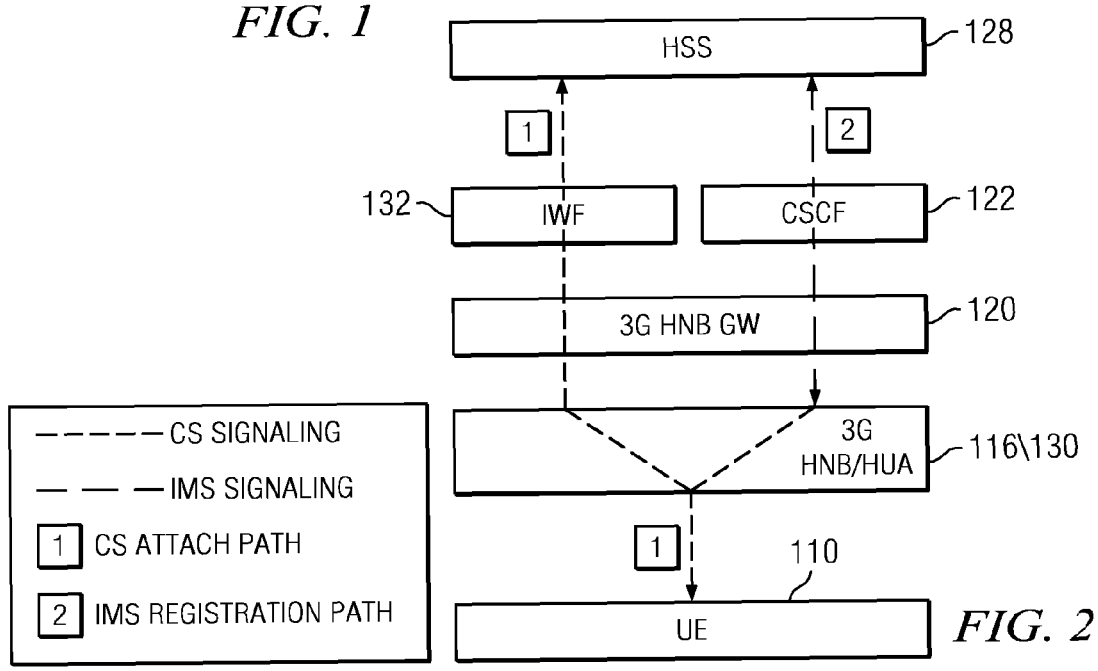
FIG. 2 illustrates a functional architecture diagram for circuit-switched user equipment network attachment in accordance with an embodiment of the present invention.

FIG. 2 illustrates a simplified functional architectural diagram in accordance with an embodiment of the present invention to better illustrate the separation of the session control and mobility components. As illustrated in FIG. 2, the CS UE 110 performs a single CS attach procedure with the 3G HNB 116 and the HUA 130, i.e., the femtocell access point. The 3G HNB 116 and the HUA 130 are collectively referred to as the HNB/HUA 116 for the purposes of this discussion.

The HNB/HUA 116 receives the CS attach request and separates the session control and the mobility components. The HNB/HUA 116 initiates two attach procedures. The first attach procedure initiated by the HNB/HUA 116 is a CS attach procedure with the IWF 132 for mobility. A second attach procedure is an IMS registration procedure, such as an early IMS security registration or a NASS-bundled authentication (NBA) security registration. This IMS registration procedure provides access to the IMS system and may include establishing an IPsec tunnel. Accordingly, from the perspective of the CS UE 110, a single CS attach is performed and the CS UE 110 is unaware of the separation of the session control and mobility by the HNB/HUA 116.

Figure 3:
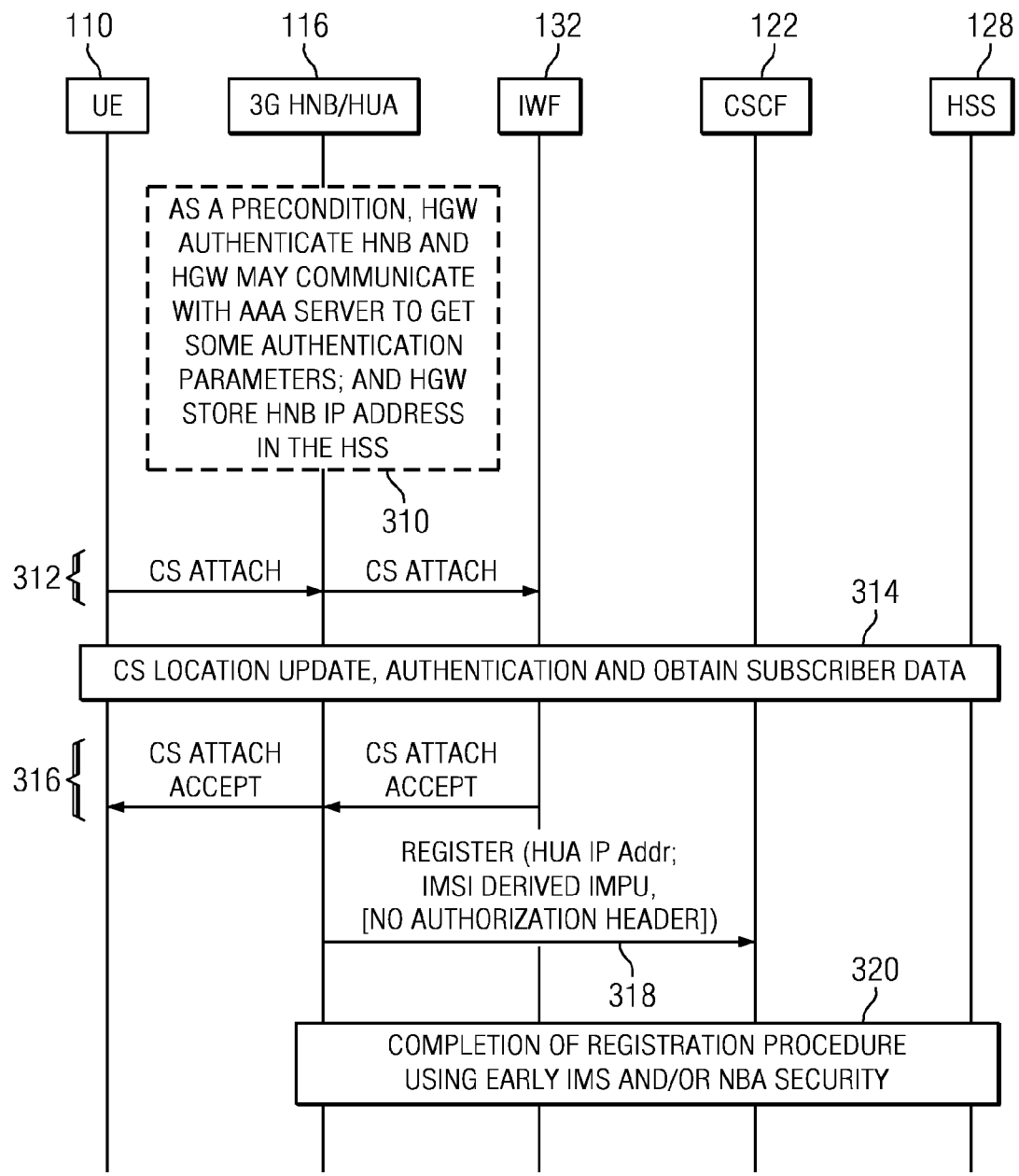
FIG. 3 is a message flow diagram illustrating circuit-switched user equipment network attachment in accordance with an embodiment of the present invention.

FIG. 3 is a message flow diagram that further illustrates an attach procedure that may be used in accordance with an embodiment of the present invention. As indicated by reference numeral 310, the HNB GW 120 authenticates the HNB/HUA 116. This authentication process may involve, for example, communication with an authentication, authorization and accounting (AAA) server. After the authentication process is complete, the HNB GW 120 stores the IP address of the HNB 116 in the HSS 128.

In step 312, the CS UE 110 transmits a CS attach message to the HNB/HUA 116, which transmits the CS attach message to the IWF 132. Upon receiving the CS attach message, the CS location of the CS UE 110 is updated and an authentication procedure is performed to authenticate the CS UE 110 and to obtain subscriber data as indicated in step 314. The subscriber identity may be provided by the IWF 132 as part of a radio access network application part (RANAP) common ID procedures, whereas the CS UE 110 identify may be provided by the UE as part of a check in an international mobile equipment identify (IMEI) procedure.

After the CS attach procedure is completed, a CS attach accept message is transmitted from the IWF 132 to the CS UE 110 via the HNB/HUA 116 to signify that the CS attach was successful in step 316. This completes the CS attachment procedure for mobility within the CS domain.

In step 318, the HNB/HUA 116 initiates an IMS registration procedure by transmitting a REGISTER message to the CSCF 122. The REGISTER message includes the IP address of the HUA 130 and the international mobile subscriber identity (IMSI) derived IP multimedia public identity (IMPU). Thereafter, in step 320, an IMS registration procedure is performed using, for example, an early IMS security registration or a NBA security registration, thereby completing the session control attach procedure in the IMS domain.

Figure 4:
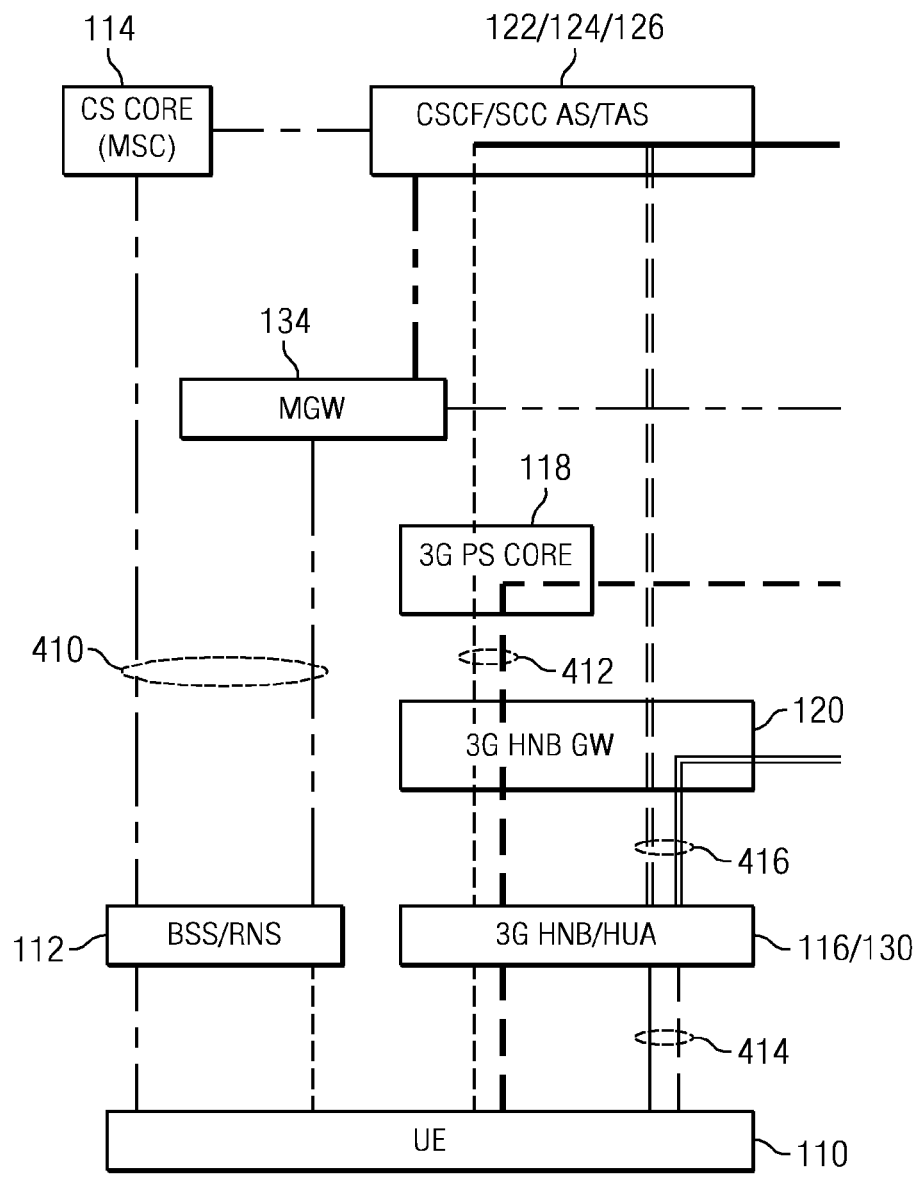
FIG. 4 illustrates a functional architecture diagram for voice session in accordance with an embodiment of the present invention.

FIG. 4 illustrates the signaling and bearer channels during a voice call in accordance with an embodiment of the present invention. It should be noted that FIG. 4 illustrates three separate scenarios. In the first scenario, illustrated by the CS signaling and bearer lines 410, the UE is a CS UE 110 serviced directly by the CS network, e.g., the BSS/RNS 112 and the CS core 114, using standard CS cellular techniques. In the second scenario, the UE is a PS UE serviced by the IMS network (e.g., the HNB 130, HNB GW 120, the PS core 118, the CSCF 122, the SCC AS 124, and the application servers 126) using IMS signaling and IP bearer channels as indicated by reference numeral 412.

The third scenario involves the case in which the UE is a CS UE 110, but is being serviced by the IMS system. As discussed above, the CS UE 110 communicates via CS techniques with the HNB/HUA 116 as indicated by reference numeral 414. The HNB/HUA 116 communicates with the IMS network via PS techniques, as indicated by reference numeral 416. The HUA 130 within the HNB/HUA 116 translates between the CS domain on the CS UE 110 side and PS domain on the IMS network side.

Figure 5:
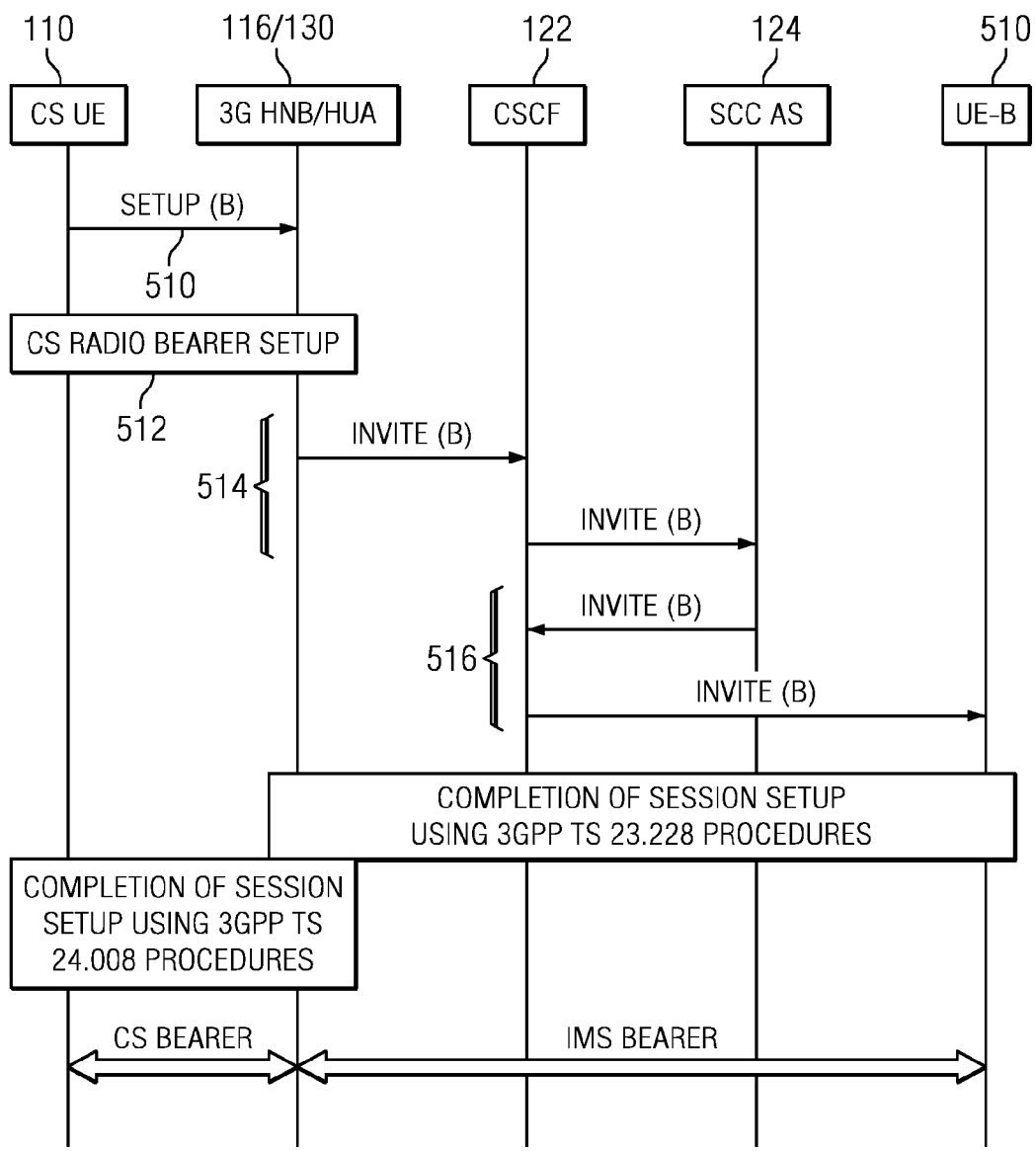
FIG. 5 is a message flow diagram illustrating an origination session in accordance with an embodiment of the present invention.

FIG. 5 is a message flow diagram illustrating an origination process for the CS UE 110 to connect via the IMS network in accordance with an embodiment of the present invention. The process begins in step 510, wherein the CS UE 110 issues a setup request identifying the other party, e.g., UE-B 510. Upon receipt of the SETUP request, the HNB/HUA 116 negotiates with the CS UE 110 to setup a CS bearer channel, as indicated by step 512.

In step 514, the HNB/HUA 116 transmits the INVITE message to the SCC AS 124 via the CSCF 122, and in step 516, the SCC AS 124 transmits the INVITE message to the designated third party, e.g., UE-B in this case. Thereafter, the IMS session between the HNB/HUA 116 and UE-B is completed using, for example, techniques as defined in 3GPP TS 23.228, v8.8.0, which is incorporated herein by reference, as illustrated in step 518, and the CS session between CS UE 110 and the HNB/HUA 116 using, for example, techniques defined in 3GPP TS 24.008, v8.5.0, which is incorporated herein by reference. As a result, a CS bearer channel is established between the CS UE 110 and the HNB/HUA 116, and an IMS bearer channel is established between the HNB/HUA 116 and UE-B 510, wherein the HUA 130 of the HNB 116 interfaces between the CS domain and the IMS domain.

Figure 6:
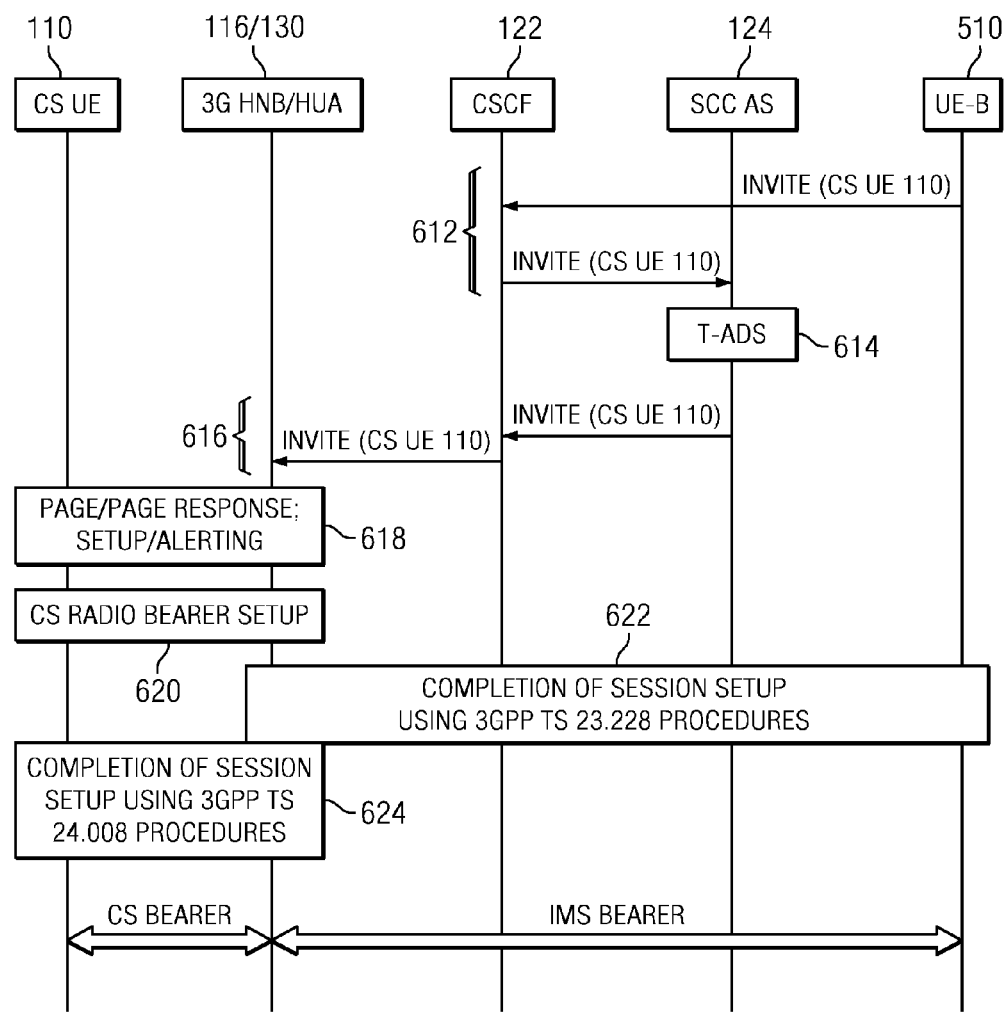
FIG. 6 is a message flow diagram illustrating a termination session in accordance with an embodiment of the present invention.

FIG. 6 is a message flow diagram illustrating a termination process on the CS UE 110 of an incoming call over the IMS network in accordance with an embodiment of the present invention. The process begins in step 612, wherein UE-B transmits an INVITE message to the SCC AS 124 via the CSCF 122, wherein the INVITE message designates the CS UE 110 as the terminating party. Next, in step 614, the SCC AS executes the terminating Access Domain Selection to select the femto access (HNB) for directing the incoming session toward the CS UE.

Thereafter, in step 616, the SCC AS 124 transmits the INVITE message to the HNB/HUA 116 via CSCF 122. Upon receipt of the INVITE message, the HNB/HUA 116 pages the CS UE 110 and sets up CS radio bearer channel as illustrated in steps 618 and 620, respectively. Thereafter, the IMS session between the HNB/HUA 116 and UE-B is completed using, for example, techniques as defined in 3GPP TS 23.228, V8.8.0, which is incorporated herein by reference, as illustrated in step 622, and the CS session is established between CS UE 110 and the HNB/HUA 116 using, for example, techniques defined in 3GPP TS 24.008, v8.5.0, which is incorporated herein by reference. As a result, a CS bearer channel is established between the CS UE 110 and the HNB/HUA 116 and an IMS bearer channel is established between the HNB/HUA 116 and UE-B, wherein the HUA 130 of the HNB 116 interfaces between the CS domain and the IMS domain. Additional information regarding this procedure may be found in 3GPP TR 23.838, v9.0.0, which is incorporated herein by reference.

Figure 7:
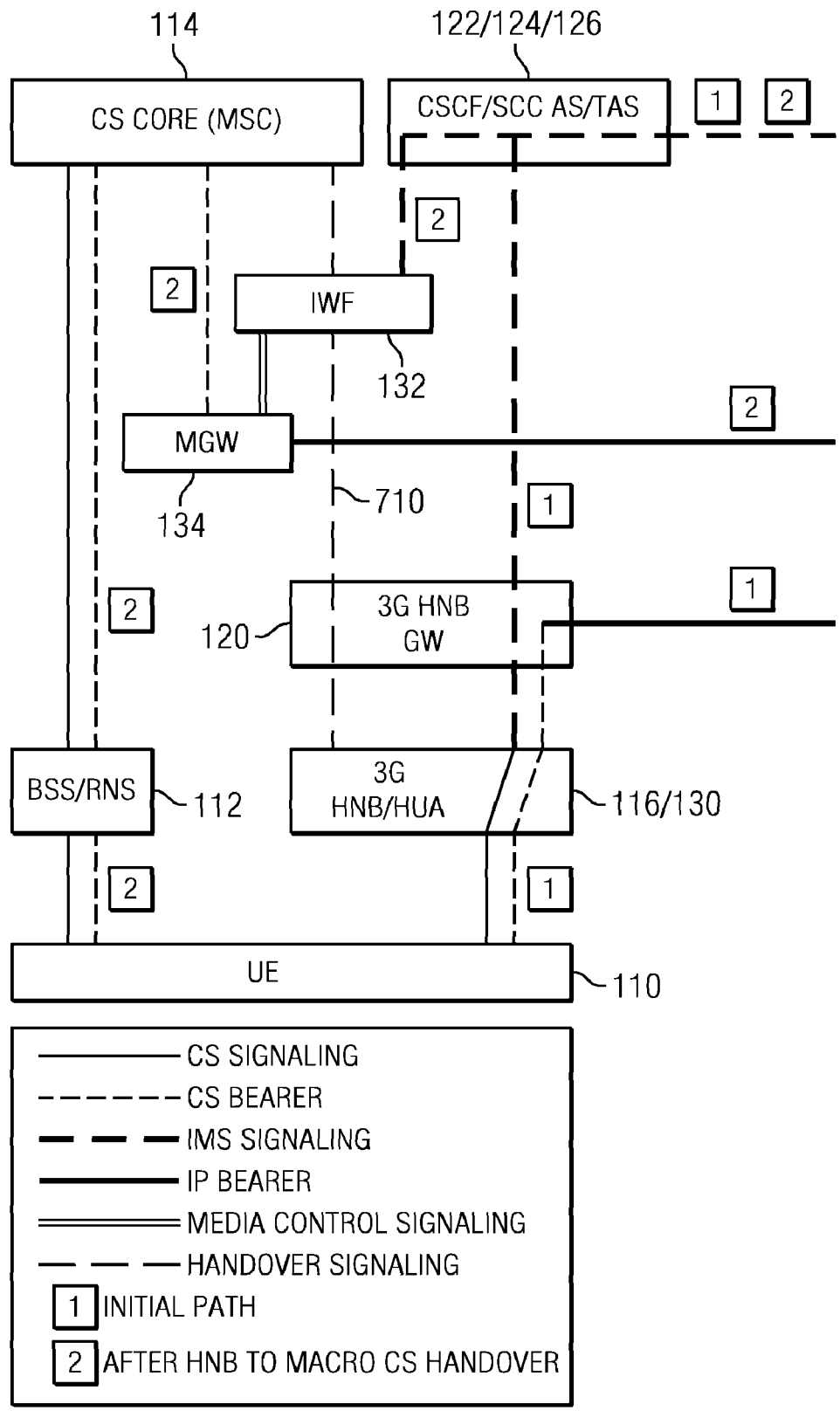
FIG. 7 illustrates a functional architecture diagram for a handover from a femtocell to a macro CS network in accordance with an embodiment of the present invention.

FIG. 7 illustrates a handover from the PS domain to the CS domain in accordance with an embodiment of the present invention, wherein boxes with reference numeral 1 represent the signaling and bearer channels prior to handover while the CS UE 110 is communicating via the femtocell (e.g., via the HNB/HUA 116) and boxes with reference numeral 2 represent the signaling and bearer channels after handover when the CS UE 110 communicates via the macro CS. Generally, there are two procedures, which may be performed in parallel. The first procedure is for the transfer of the bearer channel from the HNB/HUA 116 in the PS domain to the CS domain. This procedure begins with the HNB/HUA 116 transmitting a session transfer request to the IWF 132, as indicated by reference numeral 710, providing the session related information to the IWF 132. The IWF 132 establishes the service context for the UE as requested by the HNB 116 and initiates the Session Transfer using SR-VCC procedures as defined, for example, in 3GPP TR 23.838, v9.0.0, which is incorporated herein by reference. It should be noted that the HNB 116, the IWF 132, and the SCC AS 124 collaborate to maintain the service state upon Session Transfer, e.g., a held session remains to be held upon the SR-VCC Session Transfer procedure. Procedures as defined in 3GPP TR 23.838, which is incorporated herein by reference, may be used.

The second procedure causes the CS handover from the IWF 132 to the MSC of the CS core 114 controlling the access. The HNB 116 initiates a standard CS handover procedure toward IWF 132, which uses inter-MSC handover procedures toward the target MSC. The access leg with the source HNB/HUA 116 is released upon handover.

Figure 8:
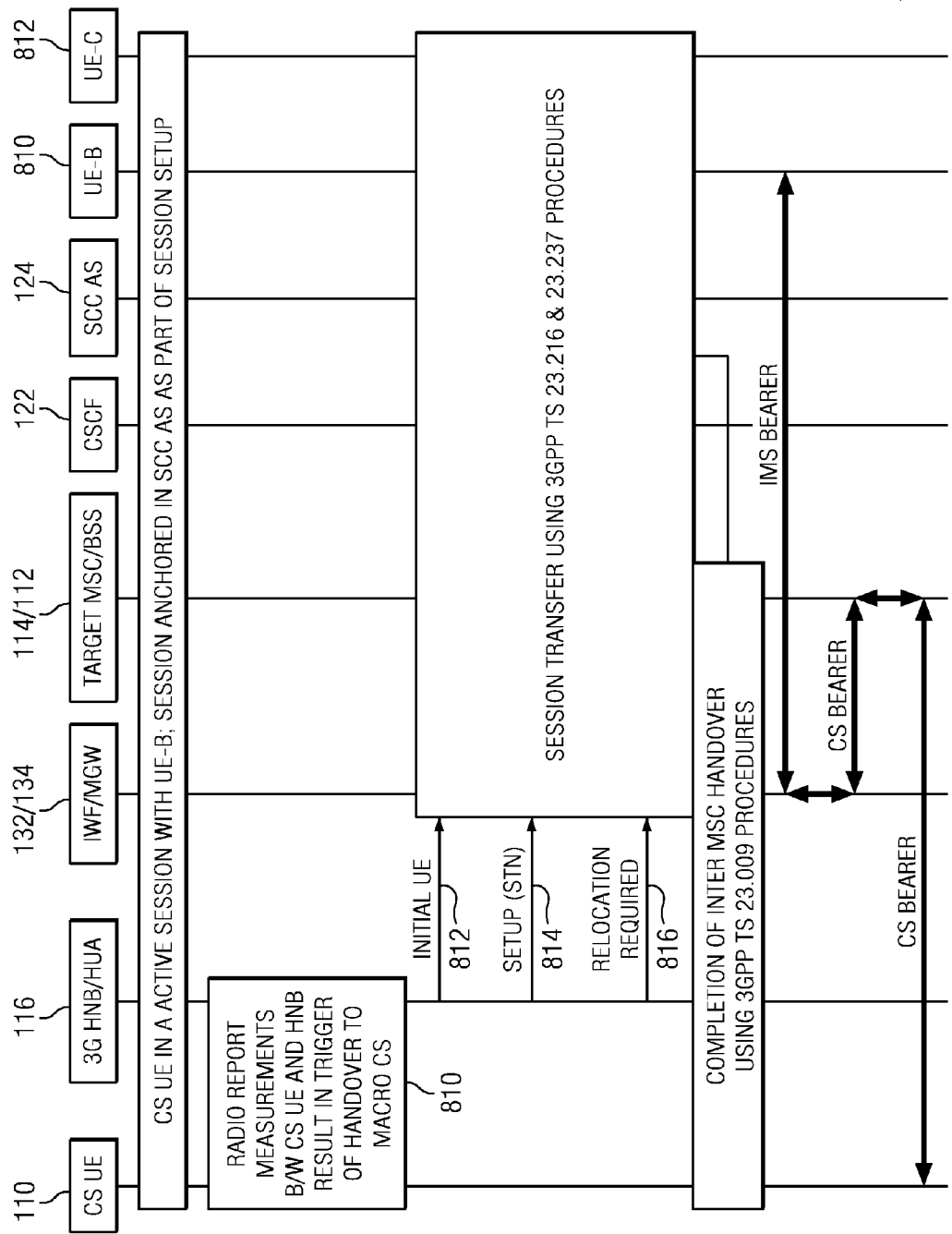
FIG. 8 is a message flow diagram illustrating a handover from a femtocell to a macro CS network in accordance with an embodiment of the present invention.

FIG. 8 is a message flow diagram illustrating messages that may be used to affect a handover in accordance with an embodiment of the present invention. In step 810, radio measurements between the CS UE 110 and the HNB/HUA 116 trigger a handover from the HNB/HUA 116 to the macro CS.

In steps 812-816, the HNB/HUA 116 initiates transfer of a session in accordance with an embodiment using procedures defined in 3GPP TS 23.216, 23.237, 23.009, and 24.008, which are incorporated herein by reference. For example, in step 812, the HNB/HUA 116 sends handover request, e.g., in an Initial UE message. Next, for example, in step 814, the HNB/HUA 116 sends a Direct Transfer message with, for example, 3GPP TS 24.008 Setup in its NAS PDU IL to establish the context for the active CS UE 110—UE-B 810 session. It should be noted that steps 812 and 814 may be combined by sending the 3GPP TS 24.008 Setup in the NAS PDU of the Initial UE message or another RANAP message.

Thereafter, in step 816, the receipt of Setup message results in RAB Assignment procedure at the IWF 132 and the HNB/HUA 116. As a result of the RAB Assignment procedure, the HNB/HUA 116 sends the Relocation Required message to initiate handover to target BSS 112. The IWF 132 then follows with completion of the procedure for transfer of the active CS UE 110—UE-B 810 session at the SCC AS 124. In parallel the target resource allocation procedure takes place at the target MSC 114 resulting in completion of handover toward target BSS 112 and switching of the CS UE 110 from HNB/HUA 116 to target BSS 112.

One of ordinary skill in the art will realize that techniques similar to those above may be used to implement other services. For example, a short message service (SMS) may be implemented such that the HNB/HUA 116 encapsulates SMS messages in a SIP method using, for example procedures defined in 3GPP TS 23.204, which is incorporated herein by reference, for delivery via the IMS system.

As another example, unstructured supplementary services data (USSD) applications may be implemented. In this example, the HUA can process the USSD and invoke the respective Multimedia Telephony (MMTEL) service for the related voice session.

In yet another example, HUA interfaces USSD with SIP for delivery via IMS. The HUA sends to the SCC AS an INVITE message including the service code and the USSD string in the SIP URI with the user set to the dialstring. The CS Access Adaptation Function (CAAF) of the SCC AS processes the USSD and invokes the service as determined by the service code (the service may be executed by the SIP AS or a SIP AS other than the SCC AS).

As one of ordinary skill in the art will appreciate, various embodiments of the invention provide a multitude of advantages. For example, the implementation can be fully scalable since it places the SIP in customer premise equipment. In addition, it completely offloads the CS Core network of the session control signaling. It also provides service continuity with CS as well as PS macro cellular. The placement of the SIP UA in the home premise equipment enables enrichment of subscriber experience with subscriber based SIP features such as picture caller id. Further, embodiments place mobility functions in the transport layer, as opposed to some other approaches that place these functions in the application layer thereby requiring tunneling of transport layer information in application layer signaling Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that different network elements, messaging, protocols, and/or the like may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing wireless communications, the method comprising:
   receiving a circuit switch (CS) attach request from a CS device;
   causing a CS bearer channel to be established with the CS device;
   causing an IP multimedia services (IMS) bearer channel to be established with an IMS system;
   providing, by a femtocell, an interface between the CS device and the IMS system; and
   sending, by the femtocell, mobility signaling to an interworking function (IWF), the IWF providing an interface for communicating the mobility signaling between the femtocell and a CS core network, wherein the mobility signaling is used for handing over a communications session of the UE from the femtocell to the CS core network.

2. The method of claim 1, further comprising performing a CS attach procedure separate from the IMS bearer channel for mobility functions.

3. The method of claim 1, further comprising handing off the CS bearer channel to a CS network element and terminating the IMS bearer channel.

4. The method of claim 1, further comprising acting as a session initiation protocol (SIP) agent for the CS device to handle session control.

5. The method of claim 1, wherein the interface transports the mobility signaling from the femtocell to the CS core network without the mobility signaling passing through a packet switched domain.

6. A method for providing wireless access to a user equipment (UE), the method comprising:
receiving, at a home node B (HNB), an attach request for wireless communications from the UE via circuit switch techniques;
separating a mobility component and a session control component of the wireless communications;
forwarding the session control component to a packet-switch network; and
forwarding, by the HNB, the mobility component to an inter-working element that provides an interface between the HNB and a circuit switch core network, wherein the mobility component includes signaling information for handing over a communications session of the UE from the HNB to the circuit switch (CS) core network.

7. The method of claim 6, further comprising:
determining that a handover is to be performed; and
handing over the wireless communications, by the HNB, from the packet-switch network to the CS core network.

8. The system of claim 6, wherein the interface transports the mobility signaling from the femtocell to the CS core network without the mobility signaling passing through a packet switched domain.

9. A system for providing wireless communications, the system comprising:
a femtocell configured for wireless communications with a user equipment (UE) using circuit switch (CS) signaling, the femtocell further configured to transmit session control information to a packet-switch (PS) network using PS signaling; and
an inter-working function (IWF) configured to provide an interface between the femtocell and a CS core network for transporting mobility signaling from the femtocell to the CS core network, wherein the mobility signaling is used to hand over a communications session of the UE from the femtocell to the CS core network.

10. The system of claim 9, further comprising a gateway configured to receive packet-switched communications from the femtocell and directing the packet-switched communications toward a destination using a packet-switched network.

11. The system of claim 9, wherein the femtocell acts as a session initiation protocol (SIP) agent for session control.

12. The system of claim 9, wherein the femtocell encapsulates short message service (SMS) messages using session initiation protocol (SIP) techniques for delivery via the packet-switch network.

13. The system of claim 9, wherein the femtocell processes unstructured supplementary services data (USSD) messages and invokes respective multimedia telephony (MMTEL) services.

14. The system of claim 9, wherein the femtocell processes unstructured supplementary services data (USSD) messages to encapsulate using session initiation protocol (SIP).

15. The system of claim 9, wherein the interface transports the mobility signaling from the femtocell to the CS core network without the mobility signaling passing through a packet switched domain.

16. A femtocell for providing wireless access to a circuit switch (CS) user equipment (UE), the femtocell comprising: a processor; and a non-transitory computer readable storage medium storing programming for execution by the processor, the programming including instructions to: establish a communications session of the CS UE, wherein the communications session is transported over path extending through the femtocell to a packet switched (PS) network; and forward a mobility signaling component to an inter-working element that provides an interface between the femtocell and a CS core network, wherein the mobility signaling component is used to execute a handover of the communications session from the femtocell to the CS core network.

17. The femtocell of claim 16, wherein the interface transports the mobility signaling from the femtocell to the CS core network without passing through the PS network.

18. The femtocell claim 16, wherein the programming further includes instructions to:
receive a short message service (SMS) message from the CS UE, the SMS message communicated via CS techniques;
encapsulate the SMS message into one or more session initiation protocol (SIP) messages; and
deliver the one or more SIP messages to the PS network.

19. The femtocell of claim 16, wherein the programming further includes instructions to:
process unstructured supplementary services data (USSD) messages and invoke respective multimedia telephony (MMTEL) services.

20. The femtocell of claim 16, wherein the programming further includes instructions to:
encapsulate unstructured supplementary services data (USSD) messages using session initiation protocol (SIP).

* * * * *